(12) United States Patent
Lindberg et al.

(10) Patent No.: US 9,112,928 B2
(45) Date of Patent: Aug. 18, 2015

(54) METHOD AND APPARATUS FOR AUTOMATIC LOADING OF APPLICATIONS

(75) Inventors: Phillip Lindberg, Helsinki (FI); John Anthony Evans, Helsinki (FI); Johan Frossen, Helsinki (FI); Josephine Gianni, Helsinki (FI); Andreas Heiner, Espoo (FI)

(73) Assignee: Nokia Technologies Oy, Espoo (FI)

( * ) Notice: Subject to any disclaimer, the term of this patent is extended or adjusted under 35 U.S.C. 154(b) by 1809 days.

(21) Appl. No.: 12/475,174

(22) Filed: May 29, 2009

(65) Prior Publication Data
US 2010/0306762 A1 Dec. 2, 2010

(51) Int. Cl.
G06F 9/44 (2006.01)
G06F 9/445 (2006.01)
H04L 29/08 (2006.01)

(52) U.S. Cl.
CPC ...... H04L 67/34 (2013.01); G06F 8/61 (2013.01); H04L 67/306 (2013.01); G06F 9/44505 (2013.01)

(58) Field of Classification Search
CPC ......... G06F 8/61; G06F 9/445; G06F 15/025; G06F 21/51
USPC .................................. 717/176, 172, 177, 178
See application file for complete search history.

(56) References Cited

U.S. PATENT DOCUMENTS

| | | | |
|---|---|---|---|
| 6,438,579 B1* | 8/2002 | Hosken | 709/203 |
| 6,530,081 B1* | 3/2003 | Hayes, Jr. | 717/176 |
| 6,643,690 B2 | 11/2003 | Duursma et al. | |
| 6,999,748 B2 | 2/2006 | White | |
| 7,409,463 B2 | 8/2008 | Ramachandran | |
| 7,725,554 B2* | 5/2010 | Lam et al. | 709/209 |
| 7,756,955 B2* | 7/2010 | Takagi | 709/221 |
| 7,779,085 B2* | 8/2010 | Neil et al. | 709/217 |
| 7,810,074 B2* | 10/2010 | Yano et al. | 717/127 |
| 8,146,074 B2* | 3/2012 | Ito et al. | 717/170 |
| 8,250,150 B2* | 8/2012 | Beck et al. | 709/206 |
| 2003/0172044 A1 | 9/2003 | ShamRao | |
| 2003/0237093 A1 | 12/2003 | Marsh | |

(Continued)

OTHER PUBLICATIONS

International search report and written opinion for corresponding international application No. PCT/FI2010/050420 dated Oct. 22, 2010, pp. 1-17.
Nokia & Microsoft Unveil App Stores At Mobile World Congress, Pahwa, Nikhil, Feb. 16, 2009, medianama.com/2009/02/233-nokia-microsoft-unveil-appstores-at-mobile-word-congress/, pp. 1-8.
Nokia Launching New "Ovi" App Store in May, Mack, Christopher, Inside Social Games, Mar. 6, 2009, insidesocialgames.com/2009/03/06/nokia-launching-new-ovi-app-store-in-may/, pp. 1-5.

(Continued)

Primary Examiner — Ernest Unelus
Assistant Examiner — Getente A Yimer
(74) Attorney, Agent, or Firm — Ditthavong & Steiner, P.C.

(57) ABSTRACT

An approach is provided for automatic loading of applications, including receiving user identification corresponding to a device. Data is also received, which indicates a set of one or more relevant applications that are a subset of multiple available applications. The set is automatically selected based on the user identification and an application favored by a contact associated with the user. Installation is initiated of an application of the selected set within the device. In some embodiments, access is provided to a social service via a network. The social service includes data that indicates multiple users, contacts among the users, and applications favored by the users. Access is also provided to receive at the social service a request message indicating user identification for a first user at a first network node. A message indicating a relevant application based on an application favored by a contact of the first user is transmitting to the first network node.

20 Claims, 11 Drawing Sheets

(56) References Cited

U.S. PATENT DOCUMENTS

| | | | |
|---|---|---|---|
| 2004/0002326 A1* | 1/2004 | Maher | 455/418 |
| 2004/0034799 A1 | 2/2004 | Mikami | |
| 2006/0235873 A1 | 10/2006 | Thomas | |
| 2007/0245347 A1* | 10/2007 | Oya et al. | 717/176 |
| 2008/0005073 A1 | 1/2008 | Meek et al. | |
| 2008/0120611 A1 | 5/2008 | Aaron | |
| 2008/0168437 A1* | 7/2008 | Chen et al. | 717/176 |
| 2008/0215581 A1 | 9/2008 | Messing et al. | |
| 2008/0239083 A1* | 10/2008 | Kusaka et al. | 348/207.1 |
| 2008/0270561 A1* | 10/2008 | Tang et al. | 709/207 |
| 2008/0301660 A1 | 12/2008 | Rao et al. | |
| 2009/0031296 A1* | 1/2009 | Boudreau et al. | 717/174 |
| 2009/0094598 A1* | 4/2009 | Asai | 717/176 |
| 2009/0138691 A1 | 5/2009 | Peterson | |
| 2009/0215440 A1 | 8/2009 | Perez Dolset | |
| 2010/0161600 A1* | 6/2010 | Higgins et al. | 707/736 |

OTHER PUBLICATIONS

Nokia Unveils Ovi Store, Application Sales to Debut in May, Wauters, Robin, TechCrunch, Feb. 16, 2009, techcrunch.com/2009/02/16/nokia-unveils-ovi-store-application-sales-to-debut-in-may/, pp. 1-7.

OpenFeint Platform Launches With Facebook Connect and Twitter User Authentication, Scott, Jeff, 148Apps, Mar. 19, 2009, www.148apps.com/news/openfeint-platform-launches-facebook-connect-twitter-user-authentication/, pp. 1-13.

Social location transforms services to offer unparalled opportunities for content providers, Nokia to deliver highly relevant content with Ovi App Store, Feb. 16, 2009, symbian-freak.com/news/009/02/nokia_launched_app_store.htm, pp. 1-4.

Whrrl Brings Mobile Social Discovery to the BlackBerry, FierceWireless, Jun. 3, 2008, fiercewireless.com/press-releases/whrrl-brings-mobile-social-discovery-blackberry, pp. 1-3.

* cited by examiner

METHOD AND APPARATUS FOR AUTOMATIC LOADING OF APPLICATIONS

BACKGROUND

Given that service providers are continually challenged to deliver new and sophisticated applications, such demand can place significant resource strain on end user devices. For instance, a multitude of applications have emerged to provide wide ranging services to the end users. However, this variety is achieved at a cost to the end devices, particularly in a mobile environment where resources are constrained. For example, many mobile nodes are small devices with limited screen space and processing power; and are heavily burdened by a large number of applications.

SOME EXAMPLE EMBODIMENTS

Therefore, there is a need for automatic installation of only most relevant applications for a user device.

According to one embodiment, a method includes receiving user identification corresponding to a device. Data is also received, which indicates a set of one or more relevant applications that are a subset of multiple available applications. The set is automatically selected based on the user identification and an application favored by a contact associated with the user. Installation is initiated of an application of the selected set within the device.

According to another embodiment, a computer-readable storage medium carrying one or more sequences of one or more instructions which, when executed by one or more processors, cause an apparatus to at least receive user identification for a user of the apparatus. The apparatus is further configured to receive data indicating a set of one or more relevant applications comprising a subset of a plurality of available applications. The set is automatically selected based on the user identification and an application favored by a contact associated with the user. The apparatus is further configured to initiate installation of an application of the selected set.

According to another embodiment, an apparatus includes means for receiving user identification corresponding to a device, and means for receiving data that indicates a set of one or more relevant applications that are a subset of multiple available applications. The set is automatically selected based on the user identification and an application favored by a contact associated with the user. The apparatus further includes means for installing an application of the selected set.

According to another embodiment, an apparatus includes at least one processor, and at least one memory including computer program code. The at least one memory and the computer program code are configured to, with the at least one processor, cause the apparatus to at least determine that no applications are pre-installed within the apparatus, and receive user identification for a user of the apparatus. The apparatus is further configured to receive data indicating a set of one or more relevant applications comprising a subset of a plurality of available applications. The set is automatically selected based on the user identification. The apparatus is further configured to initiate installation of an application of the selected set.

According to one embodiment, a method includes providing access to a social service via a network. The social service includes social service data that indicates a plurality of users, contacts among the plurality of users, and applications favored by the plurality of users. The method further comprises providing access to receive at the social service a request message indicating user identification for a first user at a first network node. A message is transmitted to the first network node. The transmitted message indicates a relevant application based on an application favored by a contact of the first user.

According to one embodiment, a method includes storing data indicating a plurality of users, contacts among the plurality of users, and applications favored by the plurality of users. The method also includes receiving data indicating user identification for a first user at a first network node. A relevant application is selected based on an application favored by a contact of the first user. The method includes initiating sending to the first network node a message that indicates the relevant application.

According to another embodiment a computer-readable storage medium carrying one or more sequences of one or more instructions which, when executed by one or more processors, cause an apparatus to perform at least store data indicating a plurality of users, contacts among the plurality of users, and applications favored by the plurality of users. The apparatus is also caused to receive data indicating user identification for a first user at a first network node, and select a relevant application based on an application favored by a contact of the first user. The apparatus if further configured to initiate sending to the first network node a message comprising data that indicates the relevant application According to one embodiment, an apparatus includes means for storing data indicating a plurality of users, contacts among the plurality of users, and client applications favored by the plurality of users. The apparatus also includes means for receiving data indicating user identification for a first user at a first network node; and means for selecting a relevant application based on an application favored by a contact of the first user. The apparatus includes means for sending to the first network node a message that indicates the relevant application.

According to another embodiment, an apparatus includes at least one processor, and at least one memory including computer program code. The at least one memory and the computer program code are configured to, with the at least one processor, cause the apparatus to at least store data indicating a plurality of users, contacts among the plurality of users, and applications favored by the plurality of users. The apparatus is also caused to receive data indicating user identification for a first user at a first network node, and select a relevant application based on an application favored by a contact of the first user. The apparatus if further configured to initiate sending to the first network node a message comprising data that indicates the relevant application.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings, in which.

DETAILED DESCRIPTION OF EXAMPLE EMBODIMENTS

A method, apparatus, and software are disclosed for automatic loading of a slate of applications on a user device. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although several embodiments of the invention are discussed with respect to applications for a mobile terminal, embodiments of the invention are not limited to this context. It is explicitly anticipated that both stand alone and client processes on either mobile or fixed wired or wireless nodes on a network may implement embodiments of the invention, and the term application is used to refer to any of these processes.

Figure 1:
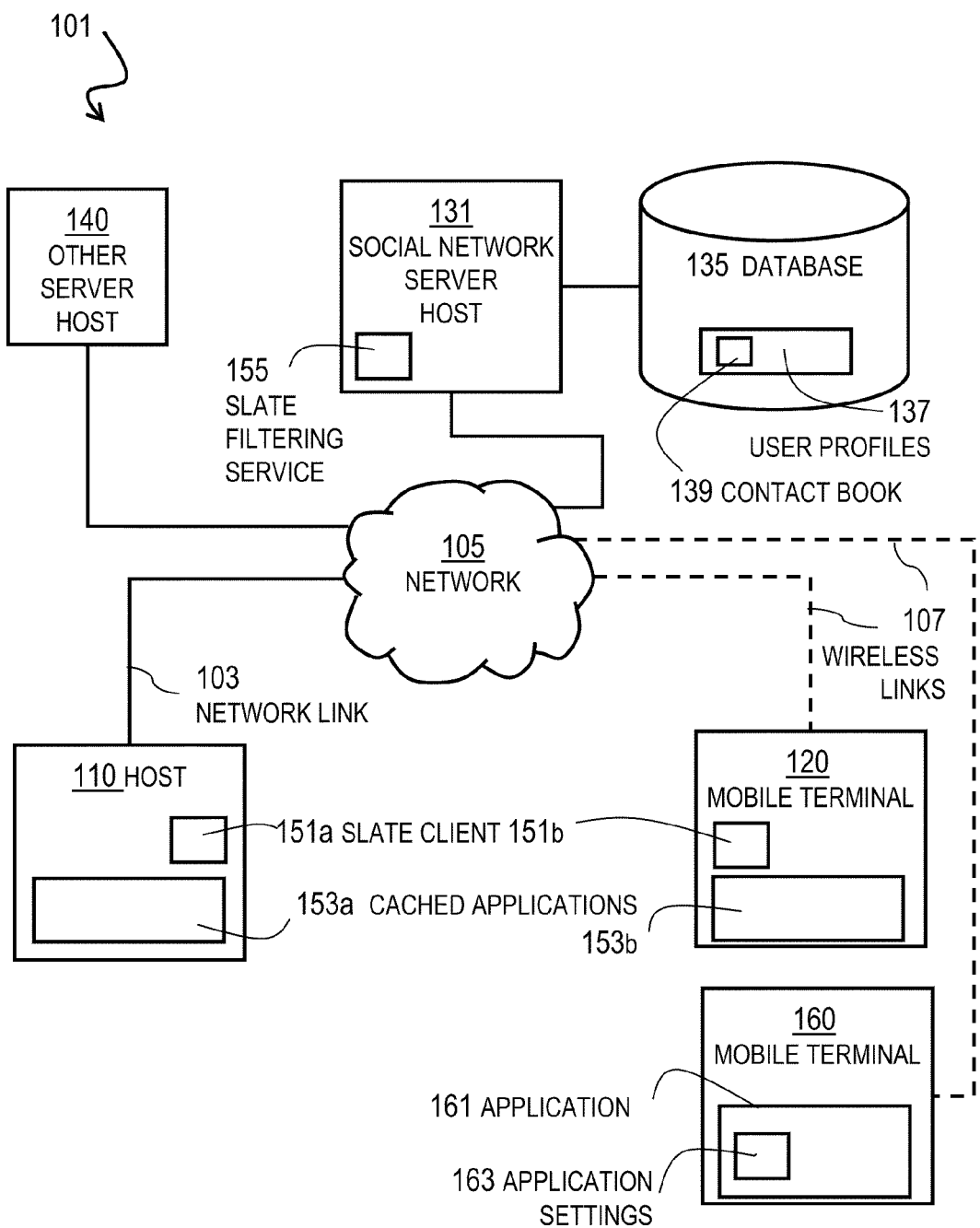
FIG. 1 is a diagram of a system for automatic loading of a slate of applications on a user device, according to one embodiment.

FIG. 1 is a diagram of a system 101 for automatic loading of a slate of applications on a user device, according to one embodiment. The system 101 includes network 105 connected to multiple network nodes, including host 110, mobile terminal 120, server host 131, other server host 140 and another mobile terminal 160. Server host 131 is connected to database 135. Traditionally, devices are pre-loaded with a variety of applications without regard to the preferences of the users; as such, these devices are unnecessarily burdened with applications that will largely be unused. Consequently, precious resources of these devices are wasted.

In various embodiments, nodes 110, 120, 131, 140, 160 can be any type of fixed terminal, mobile terminal, or portable terminal including desktop computers, laptop computers, handsets, stations, units, devices, multimedia tablets, Internet nodes, communicators, Personal Digital Assistants (PDAs), mobile phones, mobile communication devices, audio/video players, digital cameras/camcorders, televisions, digital video recorders, game devices, positioning devices, or any combination thereof. Moreover, the nodes may have a hard-wired energy source (e.g., a plug-in power adapter), a limited energy source (e.g., a battery), or both. It is further contemplated that the nodes 110, 120, 131, 140 can support any type of interface to the user (such as "wearable" circuitry, etc.). In the illustrated embodiment, node 110 is a fixed host connected to network 105 by a wired network link 103; and node 120 and node 160 are wireless mobile terminals (also called mobile stations and described in more detail below with reference to FIG. 12). The mobile terminals 120 and 160 are connected to network 105 by a wireless links 107.

By way of example, the communication network 105 of system 100 can include one or more wired and/or wireless networks such as a data network (not shown), a wireless network (not shown), a telephony network (not shown), or any combination thereof, each comprised of zero or more nodes. It is contemplated that the data network may be any local area network (LAN), metropolitan area network (MAN), wide area network (WAN), the Internet, or any other suitable packet-switched network, such as a commercially owned, proprietary packet-switched network, e.g., a proprietary cable or fiber-optic network, or any combination thereof. In addition, the wireless network may be, for example, a cellular network and may employ various technologies including code division multiple access (CDMA), wideband code division multiple access (WCDMA), enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, wireless fidelity (WiFi), satellite, and the like. In various embodiments, communication network 105, or portions thereof, can support communication using any protocol, for example, the Internet Protocol (IP).

Information is exchanged between network nodes of system 101 according to one or more of many protocols (including, e.g., known and standardized protocols). In this context, a protocol includes a set of rules defining how the nodes interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model. The OSI Reference Model is generally described in more detail in Section 1.1 of the reference book entitled "Interconnections Second Edition," by Radia Perlman, published September 1999.

The client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates.

Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

In the illustrated embodiment, a social network server executes on host 131 and communicates with database 135, which includes user profiles data structure 137. The user profiles data structure 137 associates with each user of the social network service, user information (such as user identifier, user age, user home address, and user network address), user contact information (such as identifiers and network addresses of friends of the user), and application usage for each user (e.g., in a portion of the data structure called a contact book 139). Application usage includes any kind of information that indicates the applications the associated user employs, including how often and at what time each application is executed by each user.

Each user device, such as host 110 and mobile terminal 120, is delivered with zero or more pre-cached applications, e.g., some or all of cached applications 153*a* on host 110 and cached applications 153*b* on mobile terminal 120, collectively referenced hereinafter as cached applications 153. Each cached application includes enough data to install the application on the user device and initiate execution of the application even absent an active connection to network 105. This is useful because, especially in mobile terminals, network connections may be intermittent.

In an illustrated embodiment, each user device, such as host 110 and mobile terminal 120, is delivered with a slate client process, e.g., slate client process 151*a* on host 110 and slate client 151*b* on mobile terminal 120, collectively referenced hereinafter as slate clients 151. Each slate client 151 includes logic for displaying a slate of installed applications on a display device, such as a touch screen, of the user device. As used herein, a "slate" of applications refer to candidate applications that are to be considered and/or designated for a particular user.

According to some embodiments, the slate client 151 does not install all applications available in cached applications 153 or available from one or more servers connected to network 105, but only one or more of a subset of relevant applications selected among all available applications as determined by a slate filtering service module 155 on the social network server host 131.

In some embodiments, the settings for one or more selected applications are imitated from the settings used by contacts of the user, such as a reviewer who promoted the application or a contact in a user's contact list or a friend on a social network. This technique, called herein "policy-by-imitation," harnesses the strength inherent to social networks. A user who starts using new applications obtains the policies resulting from the settings used by other users, which are likely to deviate from the default policies proposed by the application provider. If the policies are obtained from trusted sources (e.g., friends, expert reviewers) the new user can expect that the policies are sensible. At the same time, any parameter interdependency problem is, to a large extent, solved. Moreover, the service configuration and policies used provide behavior consistent with the review given by the reviewer (friend, expert). The "policy-by-imitation" approach makes especially good sense if the user starts using applications based on recommendation by friends or expert reviewers, and with little of the user's own personal experience.

In the illustrated embodiment, mobile terminal 160 includes an installed application 161 with settings 163. When the user of mobile terminal 120 decides to install the application, the user has the option to include the settings on terminal 160 of a contact of the user.

Although a particular set of nodes, processes, and data structures are shown in FIG. 1 for purposes of illustration, in various other embodiments more or fewer nodes, processes and data structures are involved. Furthermore, although processes and data structures are depicted as particular blocks in a particular arrangement for purposes of illustration, in other embodiments each process or data structure, or portions thereof, may be separated or combined or arranged in some other fashion.

FIG. 2 is a diagram of an initial slate of applications on a user device, according to one embodiment. The user device is mobile phone 201 which includes a display screen. When the mobile phone is turned on out of the box, a predetermined screen 203, called a "blank slate screen" herein, is presented on the display device, as the mobile phone attempts to set up a wireless link with network 105.

The blank slate screen 203 indicates no pre-installation of applications. This is an advantage over current practice, in which many pre-installed applications are included on the initial screen of the out of the box user device, because, as mentioned, many of those pre-installed applications are of little or no interest to the user, yet icons for those applications take up real estate on the user's device display, real estate that is very valuable on a small screen typically available on many mobile phones. As used herein, an "icon" is a portion of a display that includes at least one of text or graphical elements or graphical elements that can be activated by a user. In these embodiments, rather than buying a device pre-loaded with applications/software/services/settings, users start with a 'blank-slate' so they can control and choose the tools and settings they really want and use. This is a form of personalization that challenges the current device/application bundle offer from a user device manufacturer or network service provider that is standard in the industry.

The choice of applications can be overwhelming; therefore a social discovery framework helps the user choose from the vast number of services in a very relevant and personal way. Thus the slate client 151 on the user device uses network 105 to contact the slate filtering service 155 on the social network server host 131 to indicate what applications would be of interest to the user. This process relieves the burden of having to make sense of the many preinstalled apps and services, allowing the user to customize each device they have in a way that meets their needs and desires. The process of informing the user of the possibilities is transferred from the manufacturer of the mobile phone 201 or the network service provider to the user's social network—an entity that is far more influential on an individual basis.

Figure 2A:
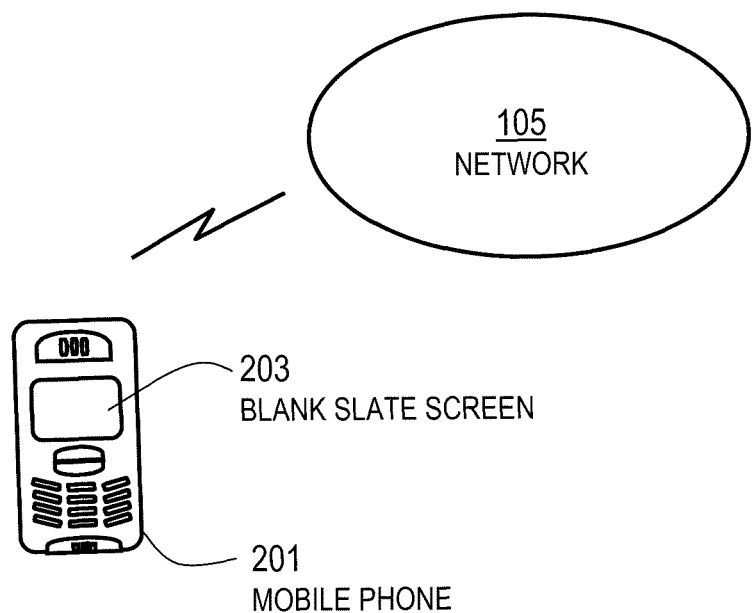
FIG. 2 is a diagram of an initial slate of applications on a user device, according to one embodiment.
FIG. 2B is a diagram of modules for loading a slate of applications on a mobile terminal according to an embodiment.
Figure 2B:
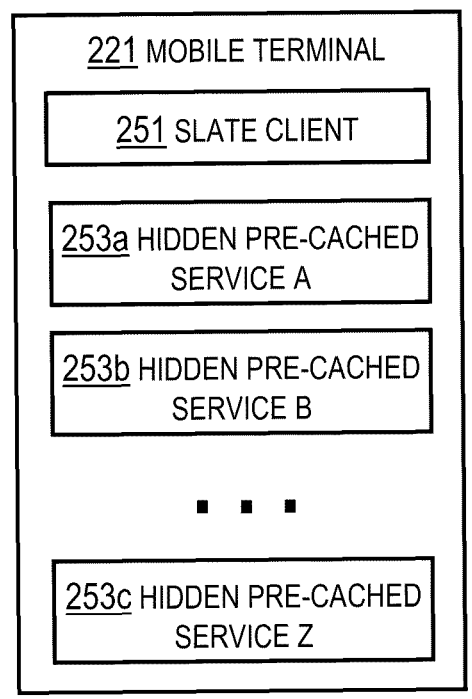

FIG. 2B is a diagram of modules for loading a slate of applications on a mobile terminal 221 according to an embodiment. The mobile terminal 221 includes a slate client module 251, configured to perform a slate client process, e.g., process 151. A cached applications data structure 153 includes zero or more hidden, pre-cached service modules installed on the mobile phone by the manufacturer or network service provider but not displayed on the blank slate screen. As used herein, a pre-cached application is one stored on a user device before the device is first used by the user, e.g., delivered with the device and already stored on the device when that device is taken out of the box by the user. Because icons representing these pre-cached services, among others, are not displayed on the display device of the user device, in the illustrated embodiment, the services are said to be "hidden." In the illustrated embodiment, the data structure 153 includes hidden pre-cached service A 253a, hidden pre-cached service B 253b, hidden pre-cached service Z 253c, and zero or more additional hidden pre-cached services indicated by ellipsis, collectively referenced hereinafter as hidden pre-cached services 253.

Figure 3:
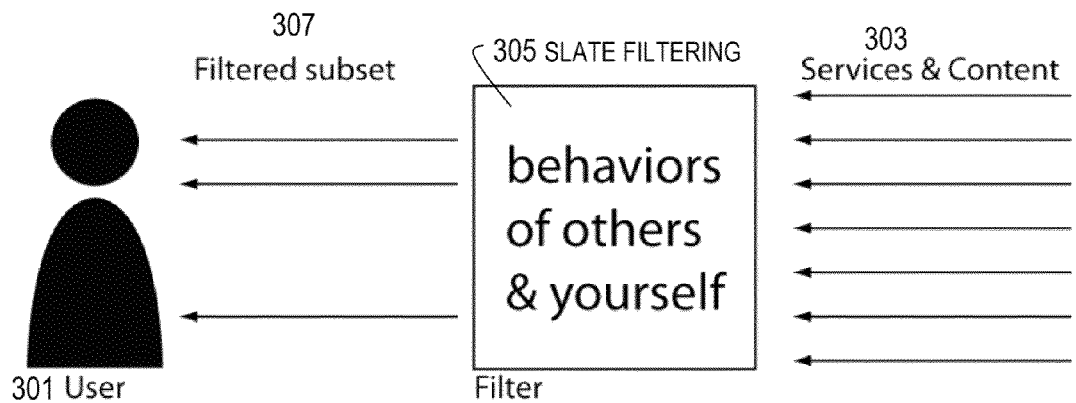
FIG. 3 is a diagram of a process on the system of FIG. 1, according to one embodiment.

FIG. 3 is a diagram of a process on the system of FIG. 1, according to one embodiment. For example, the data flow depicted in FIG. 3 is provided by slate filtering service 155. The profiles of users are tapped to obtain information 303 about these people and their usage history of services and content. This information 303 is aggregated, analyzed and filtered by slate filtering process 305, such as performed by slate filtering service process 155 or corresponding module. The filtered subset 307 is then sent to the slate client module 251 and presented to the user 301 as a viral top-level function—providing recommendations that can be categorized by themes such as friends, people like me, manufacturer recommended, celebrities etc.

This service can be described as a "relevance engine"—one that helps users navigate and discover what tools are most useful/desirable to them. This resembles a very natural way to make sense of things—through people who are known and trusted. The service provides a method to make sense of an ever expanding number of communication and media services.

Over time, this aggregated information will start to reveal critical influence nodes (people who are disproportionately influential)—this is incredibly valuable information to manufacturers from a marketing and product launch perspective. It can be described as a viral spread mapping.

Figure 4:
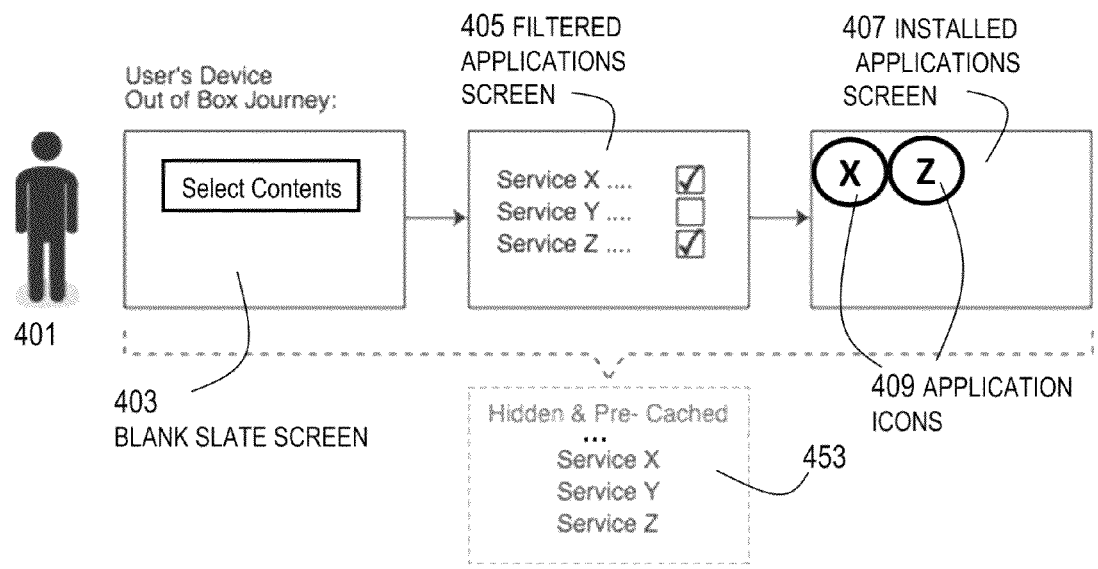
FIG. 4 is a diagram of display screens for a slate of applications on a user device; according to an embodiment.

FIG. 4 is a diagram of display screens for a slate of applications on a user device; according to an embodiment. The user 401 takes a user device, e.g., mobile phone 201, out of the box and turns it on. The blank slate screen 403 is displayed on the display device component of the user device. The blank slate screen indicates no pre-installed applications on the user device. In the illustrated embodiment, a graphical active area, e.g., a button, labeled "Select Contents" is displayed on the blank slate screen. While the blank slate screen is displayed, the slate client 151 on the user device communicates with the slate filtering service 155 through network 105, as depicted in FIG. 2A.

In response, the slate client 151 receives data that indicates a set of one or more relevant applications comprising a subset of multiple available applications. The set of relevant applications is automatically selected based on the user identification (such as the user's age and locality and the applications installed and used frequently by others of like age and geography, or the user's contacts list and the applications installed and used frequently by the members of the user's contacts list) as well as and an application favored by a contact associated with the user. Zero or more of these relevant applications are among the hidden pre-cached services 253. For purposes of illustration, it is assumed that the selected set of relevant applications are the hidden pre-cached Service X, Service Y and Service Z, depicted in block 453 representing a portion of the cached applications data structure 153. It is further assumed that the other applications available on the network 105, and other hidden pre-cached services from Service A through Service W are not in the selected set of relevant applications.

When the user wishes to install applications, the user activates the button labeled "Select Contents", e.g., by clicking a pointing device when a cursor positioned by the pointing device is located over the button. In response to the user input, a filtered applications screen 405 is presented in the display of the user device. In some embodiments, all applications of the selected set are automatically installed. In the illustrated embodiment, the user is given the option to choose among the selected set. For example, icons are displayed representing each application in the selected set. Each icon includes a label for the application and a checkbox for receiving user input. For purposes of illustration, it is assumed that the user chooses Service X and Service Z, as indicated by user input, depicted as checks in the corresponding check boxes.

In response to the user choice, the corresponding applications are installed on the user device. If the applications are not cached, then the user's device contacts a server on the network associated with the service to install the application. If the service is cached, then the application is installed based on the data stored in the data structure 153 of cached application. The installed applications are presented on the installed applications screen 407 as icons 409 that can be used to launch the application. Thus, display of an icon representing the installed client application is initiated, wherein the installed client application is launched by user input indicating activation of the icon. For example, icons for service X and service Z are depicted in installed applications screen 407 and used as a default or main menu screen for the user device, e.g., mobile phone 201. When a user subsequently activates the icon, e.g., by double clicking with a pointing device, the corresponding application is launched. In some of these embodiments, an icon representing the installed device is included among the installed applications screen even before the user' device contacts the server to completely install an application that is not cached. Installation is completed when the user device can next contact the network, e.g., network 105, or when the user first selects the icon. In either case, installation within the device of an application of the selected set is initiated.

In some embodiments, at least some the cached service modules 253 include sufficient functionality to launch and perform at least some functions when the user selects the icon representing an installed service, even if a network connection is not currently available. Data intended for a remote server are handled in a store and forward approach.

Thus, hidden pre-cached data on a device is presented as a "blank slate" (empty) to the user. The approach is suitable to handle offline "out of box" situations, by revealing hidden information as if it were part of a broader, authentic personal discovery and configuration process A cache of essential information/services/features are included to support basic initial use, even in the absence of a network connection. These embodiments provide the benefits of "thin" applications (in which most data is centralized rather than stored locally to conserve resources on the local device) but locally cached for the quick response performance of native applications. By utilizing services and caching them rather than installing applications, users do not have to manage installations or updates. In so far as these are cached, the services will work offline at least to some extent. Pre-cached services are a boon for thin services based devices if they are to be used out-of-box even when there is no connection or the connection is slow. The pre-cached services allow the device to appear to be online and functioning well even if the connection would be too slow to download content from online services. Without pre-caching, a slow or absent connection makes the out of box experience unacceptable. If services are pre-cached then it becomes a powerful quality of experience feature for users and a reason to buy such a device over another.

Figure 5:
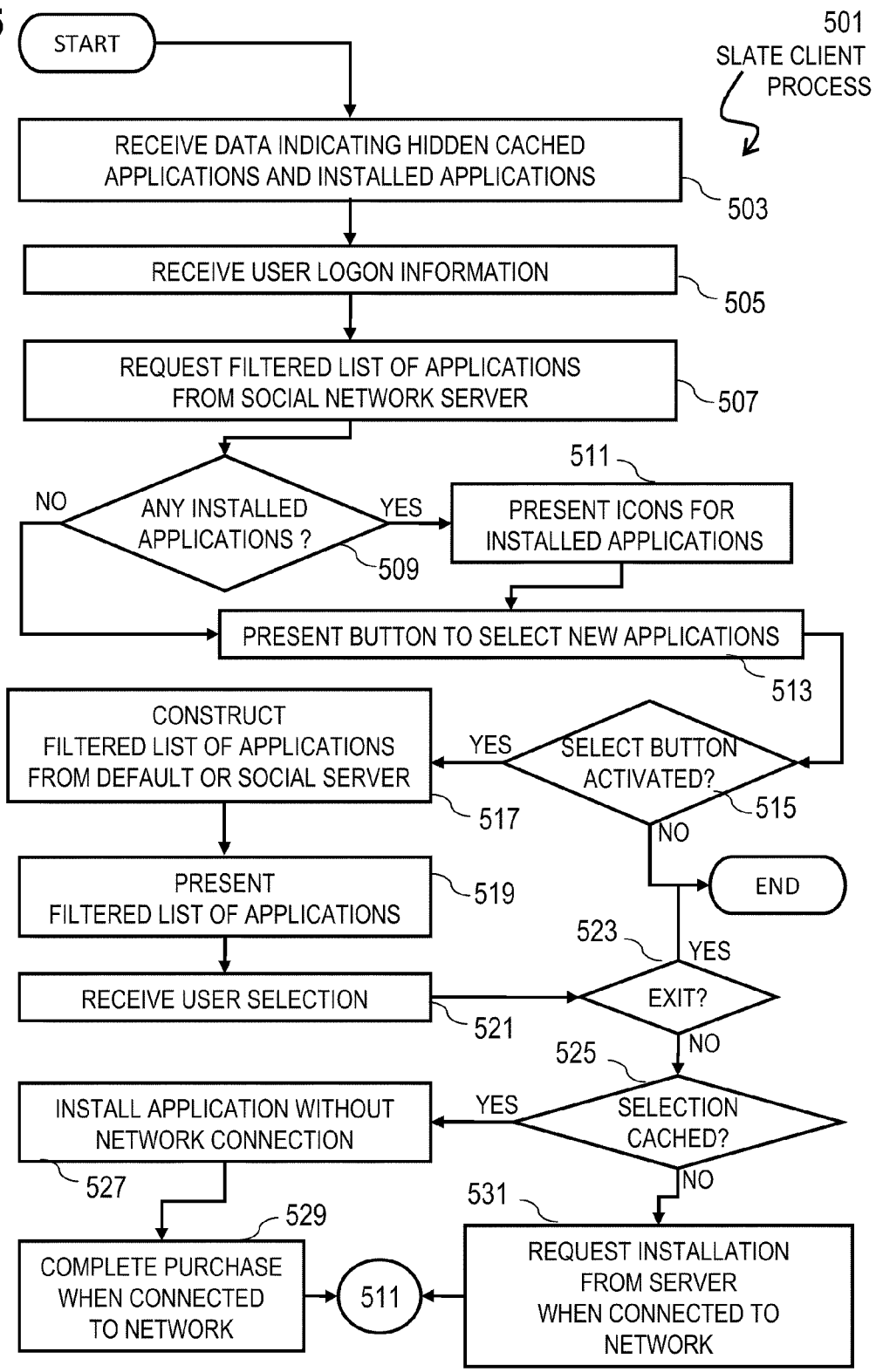
FIG. 5 is a flowchart of a slate client process on a user device, according to one embodiment.
Figure 6:
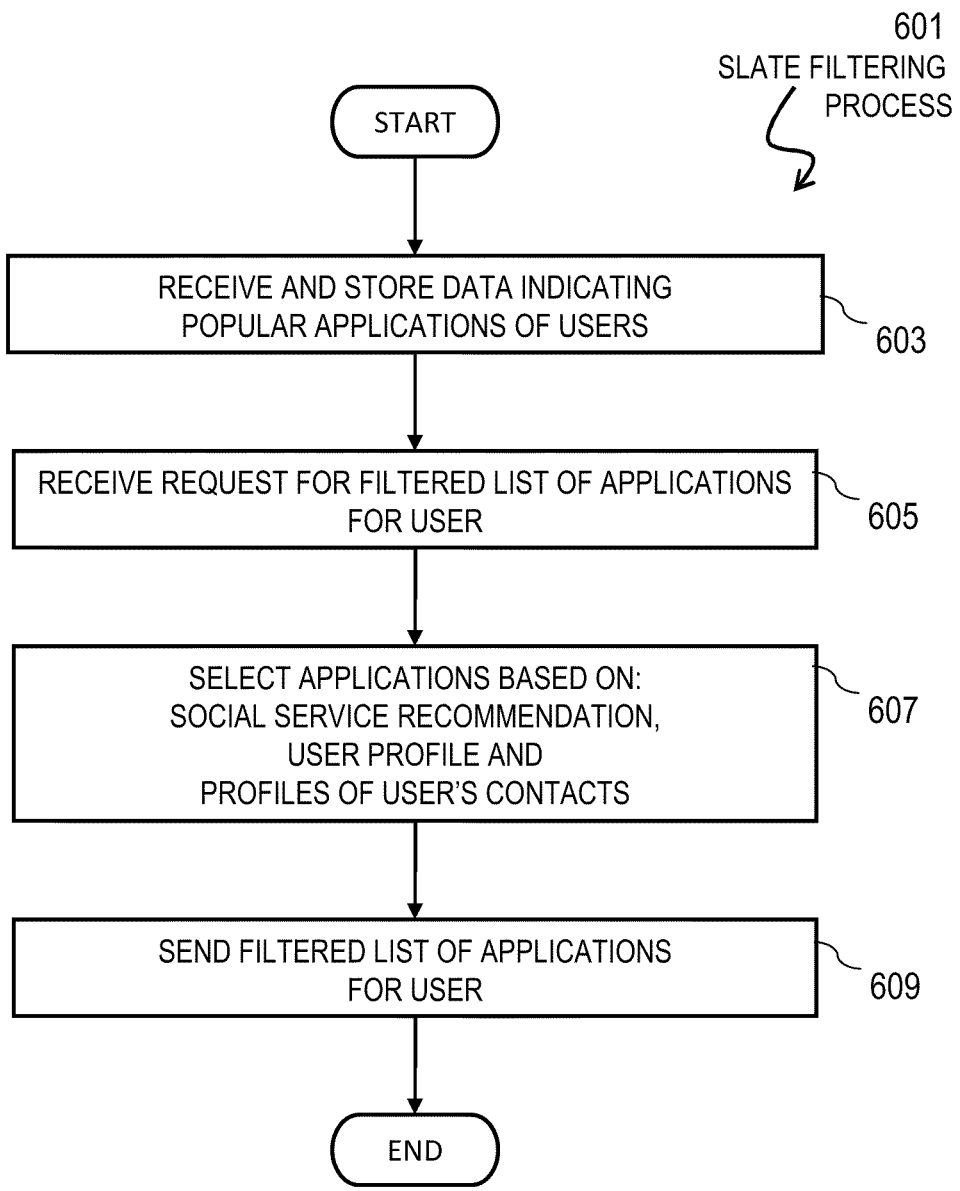
FIG. 6 is a flowchart of a slate filtering process on a server node, according to one embodiment.
Figure 7:
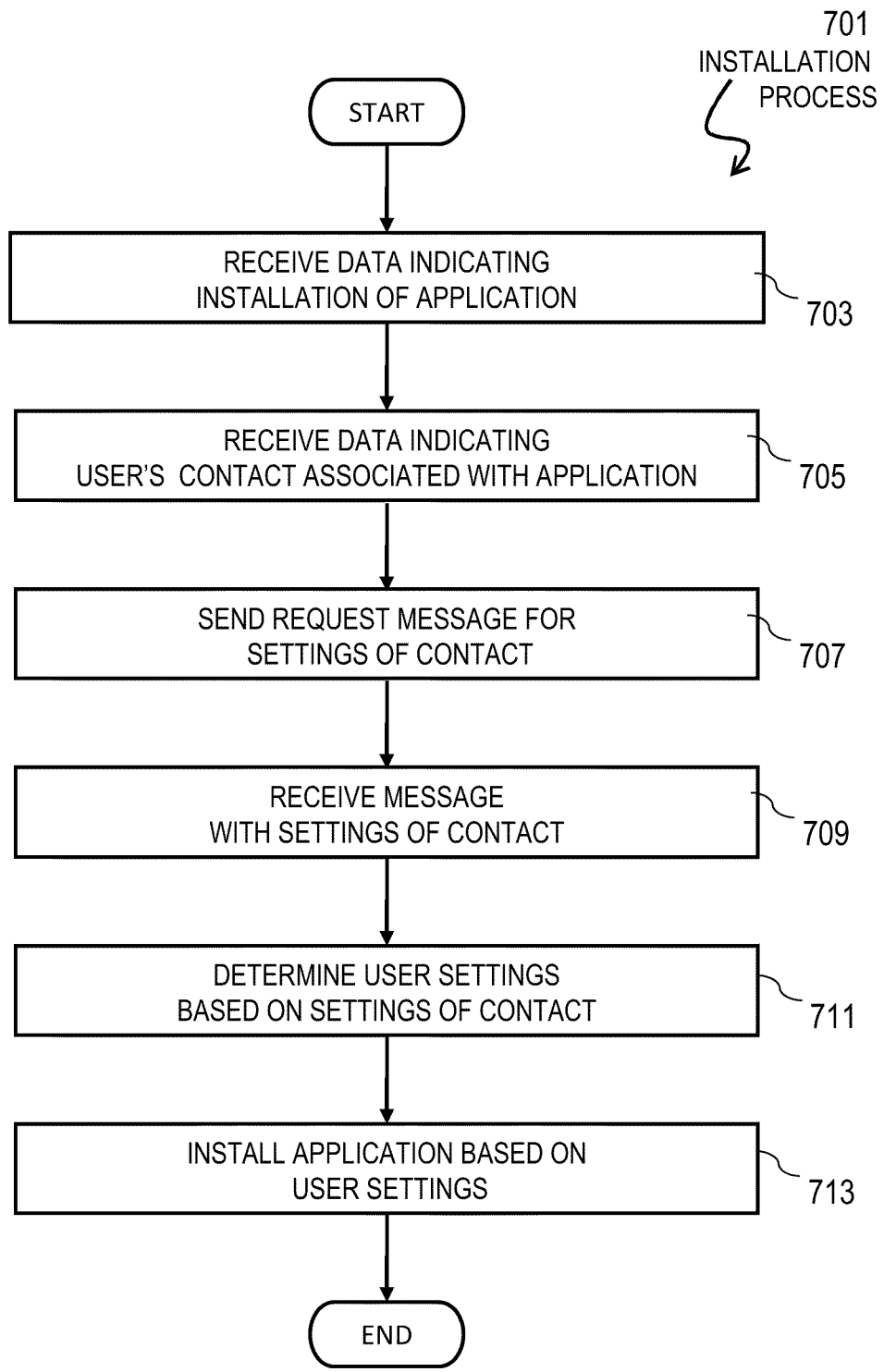
FIG. 7 is a flowchart of an applications installation process, according to one embodiment.

FIG. 5 is a flowchart of a slate client process 501 on a user device, according to one embodiment. For example, process 501 is performed by slate client process 151 or slate client module 251. Although steps in FIG. 5 and subsequent flow charts, FIG. 6 and FIG. 7, are shown in a particular order for purposes of illustration, in other embodiments, one or more steps may be performed in a different order or overlapping in time, in series or in parallel, or one or more steps may be omitted or added, or changed in some combination of ways.

In step 503, data is received indicating hidden cached applications and installed applications. These applications may be pre-cached when delivered to the user or cached subsequently, e.g., during network communications. The applications are hidden, because they are not displayed as relevant or installed applications in screens presented on a display device to a user. Any method may be used to receive this data. For example, in various embodiments, the data is included as a default value in software instructions, is received as manual input from a network administrator on the local or a remote node, is retrieved from a local file or database, or is sent from a different node on the network, either in response to a query or unsolicited, or the data is received using some combination of these methods. When the device is first taken out of the box, any pre-cached applications are hidden, and no applications are pre-installed. In some embodiments, step 503 includes initiating storing locally a copy for each of one or more of multiple available applications before receiving data indicating user identification described in the next step.

In step 505, user logon information is received. For example, the user is prompted for a user identifier and password, to ensure that an unauthorized person is not attempting to hijack a device intended for someone else. The user response is received as user logon information. Thus, step 505 represents receiving user identification corresponding to the device.

In step 507, a filtered list of applications is requested from a trusted source, such as a friend or a social network server. For example, a message is sent from slate client 151 to slate filtering service 155 on the social network server host 131. The message includes data indicating the user, such as the user identification information, and data indicating that the message is a request for applications relevant to that user, such as a particular value for a message type field in the message. Step 507, in some embodiments, includes initiating transmission of the request message to a trusted source.

In step 509, it is determined if any applications are already installed. If so, then control passes to step 511 to present icons for the installed applications on the display screen, e.g., on installed applications screen 40. Step 511 represents initiating display of an icon representing the installed client application, wherein the installed client application is launched by user input indicating activation of the icon. Control then passes to step 513.

In step 513, a button is presented that allows the user to select new applications. For example, the "Select Contents" button is presented as depicted in screen 403

If it is determined in step 509 that no applications are already installed, then control passes to step 513 directly. This branch from step 509 corresponds to determining that no applications are pre-installed within a device, when the device is first taken out of the box. The resulting screen looks as depicted in screen 403 of FIG. 4. In this branch, no icon is displayed for the locally stored available applications before receiving the data indicating the set of one or more relevant client applications.

In step 515, it is determined whether the select button is activated, e.g., whether a user has clicked a pointing device when a cursor is positioned over the button. If not, then the slate process ends and control passes to other processes on the user device, e.g., launching one of the already installed applications, if any.

If it is determined, in step 515, that the select button is activated, then in step 517, a filtered list of relevant applications is constructed. Step 517 includes receiving data indicating a set of one or more relevant applications comprising a subset of multiple available applications, wherein the set is automatically selected based on the user identification and an application favored by a contact associated with the user. In some embodiments, step 517 includes receiving a response message specifying the set, wherein the set is automatically selected based the favored application by the trusted source. In some embodiments, the message is received from some other source, such as a default list of the manufacturer's recommendations for similar users. In some embodiments, the list is sorted during step 517 into categories or themes, such as friends, people like me, or manufacturer recommended. For purposes of illustration, it is assumed that the list of relevant applications includes only Service X, Service Y and Service Z.

In step 519, the filtered, and optionally sorted, list of relevant applications is presented on a display for the user. For example, the list is presented as depicted in screen 405 as icons including a label and a checkbox. This corresponds to initiating display of the set of relevant client applications.

In step 521, data indicating a selection by the user is received. For example, it is determined in step 521 which checkboxes have been checked by the user. Checkboxes and determining whether a checkbox is selected by a user are well known in the art. This corresponds to receiving client input indicating the client application to be installed from among the set of relevant client applications.

In step 523, it is determined whether the user has selected an exit option instead of one of the icons representing a relevant application, e.g., by selecting an exit tab or button, (not shown in screen 403). If so, then the slate client process is done, as described above, and control passes to some other process. If not, then control passes to step 525.

In step 525, it is determined if the selected application is one that is already cached on the device, either pre-cached when the device was delivered, or due to subsequent communications through a network, such as network 105.

If not cached, then, in step 531, a request for installation from a server corresponding to the selected service is sent when the user device is connected to the network. In some embodiments, step 531 includes constructing a temporary icon for the service, which icon includes a label for the selected service. This step corresponds to initiating installation of the client application by requesting installation from a remote server when connected to a network. Control returns to step 511 for presenting the screen of installed icons, as described above.

If it is determined, in step 525, that the selected application is one that is already cached on the device, then in step 527 at least a part of the application is installed, such as the icon and settings or settings prompts, even without a network connection. This corresponds to initiating installation of the client application by initiating execution of a locally stored copy of the application. In step 529, the installation or purchase, if not complete, or both is completed when the user device next connects to the network. Control returns to step 511 for presenting the screen of installed icons, as described above.

FIG. 6 is a flowchart of a slate filtering process 601 on a server node, according to one embodiment. For example, process 601 is performed by slate filtering process 155 or a corresponding module.

In step 603, data indicating popular applications among users is received and stored. For example, a social network server collects user profiles of contacts for each user and applications run on the user devices of those users in user profiles data structure 137 on database 135. In some embodiments, in step 603, the slate filtering service receives and stores data indicating the user profiles data structure 137. In some embodiments, the slate filtering service itself receives reports from user devices about the applications installed and run; and collects and stores that information in its own data structure, not shown, or in the user profiles data structure 137. In either case, the host 131 stores data indicating multiple users, contacts among the users, and client applications favored by the users.

In step 605, a request is received for a filtered list of applications for a user. The request indicates the type of request and data identifying the user. Thus host 131 receives data indicating user identification for a first user at a first network node.

In step 607, relevant applications are selected based on the social service recommendation, or the user profile, or the profiles of contacts of the user, or some combination. Thus step 607 corresponds to selecting a relevant client application based on profile data for the first user or an application favored by a contact of the first user.

In step 609, the filtered list of relevant applications for the user is sent. Thus step 609 corresponds to transmitting to the first network node a message including data that indicates a relevant application based on profile data for the first user or an application favored by a contact of the first user or some combination.

In some embodiments, the installation settings for an application are imitated from a trusted source. This reduces the problems associated with installing an application. Most services and applications allow for a high degree of personalization. Configuring the application such that the expected behavior matches the actual behavior is far from trivial. In addition, the applications also require that the user makes a number of policy decisions (e.g., access control, degree of privacy) that control what information is shown to the outside world.

The flexibility of the application results in high complexity with inter-dependent system parameters. It is very easy to make conflicting parameter settings and/or policy decisions that may result in inconstant policies, unpredictable and inconsistent behavior, and even security threats such as privacy violations. A mismatch between behavior expected by the user and actual behavior might lead to a negative user experience. It might even reduce the likelihood of further usage and/or purchase of the application. Similar problems arise when parameters are re-initialization during upgrades or re-installing applications or transferring application between devices.

Typically a user installs software based on recommendations by user communities and/or friends. The description made by the reviewer (friend) is based on the configuration and policy settings the reviewer uses. Hence it makes sense to use the reviewer's settings rather than the configuration and policy settings recommended by the vendor.

FIG. 7 is a flowchart of an applications installation process 701, according to one embodiment. Process 701 is a particular embodiment of the installation step 527 or the installation step 531, or both, as depicted in client process 501 in FIG. 5.

In step 703, data is received that indicates an application is to be installed. For example, the user selects one of the relevant applications presented in a list.

In step 705, data is received that indicates a contact of the user, who is associated with the application. Any method may be used to associate the contact with the application. For example, in some embodiments, the user is prompted for and inputs a contact identifier. The user is aware of the contact who recommended the application and is fully able to respond to such a prompt. In some embodiments, the recommendation is delivered in a message to the user from the contact, e.g., in an email or text message using the Short Message Service (SMS) protocol or in an instant messaging (IM) protocol. In some of these embodiments, the installation process associates the contact who sent the application recommendation with the application. In some embodiments, the contact's profile on a social network indicates that the contact has installed the application, and this information is included in the contact book 139 of the user's profile.

In step 707, a request message is sent for the settings for the application by the contact. In this context, the contact includes anyone in the user's contact lists, other members of a social network, those members identified as trustworthy, or any experts with a presence via the network, or some combination. In some embodiments, the settings are stored with the contact information in the user's contact book. In some embodiments, the request is made of a contact book resident on the user's device, e.g., mobile terminal 120. In some embodiments, a request message is sent to the social network service on host 131 to access settings in the contact book 139 of database 135 or in the profile of the contact who is listed in the contact book 139. In some embodiments, the message is sent to the contact's device where the application is installed using the settings, e.g., to mobile terminal 160 where the application 161 is installed with the settings 163. Any protocol may be used to send the request message, including email, SMS text and IM text, among others. In some embodiments, the message is sent to retrieve the settings of multiple different contacts of the user.

Centralized and off-line implementation involves storing the policy settings that can be shared in a central server for easy access by interested parties. This is provided by a Single-Sign-On service, and can include either authenticated communication or secured communication or both.

De-centralized and on-line implementation involves just the mobile device. The settings can be shared through short-range connectivity such as BLUETOOTH™ Authentication communication is provided in some embodiments via secure pairing. These direct communications can be one-shot or continuous, in various embodiments.

In step 709, a message is received with the settings of the contact for the application. Any protocol may be used to receive the response message, including email, SMS text and IM text, among others. In some embodiments, an eXtended Markup Language (XML) document is encoded in a Hypertext Markup Language (HTML) message. In some embodiments, a proprietary format is used to provide a service-specific differentiating factor. In some embodiments, the user stays updated on changes deemed desirable by the originator of the settings with settings feeds.

The returned message depends on the policy for sharing settings at the originating node, e.g., the node receiving the message sent in step 707. Whatever policy is selected, the settings provider maintains full control over the settings provided, e.g., can set limitations to what settings are shared and with whom. A settings provider may also set additional requirements like receiving the settings that are copied, or other reciprocal requirements (payment, etc.). In some embodiments, the policy for sharing settings includes reciprocity elements (e.g., "I gave you my settings, you give me yours"). In some embodiments, the policy for sharing settings includes "paid-for" services. In some embodiments, the policy for sharing settings involves existing parameter frameworks (e.g. a registry used in some operating systems).

In step 711, the settings for the user's installation of the application are determined based on the settings of the contact. In some embodiments the contact's settings are used unaltered. In some embodiments, the settings of multiple contacts are merged together or with the default settings. In some embodiments, the settings of one or more contacts are used to form a template, and the user views the template to add or change one or more settings. Thus, the policy copied from another user can be taken "as-is", can be combined with polices obtained from other users, can be used as a template for further personalization, in various embodiments. The policy settings may also be continuously updated. The "policy-by-imitation" ("use-as") settings replace the pre-defined settings recommended by the application provider. The same mechanism can be used for parameter settings when re-installing software—called "use-as-before."

In step 713, the application is installed based on the user settings derived from one or more contacts.

Figure 8:
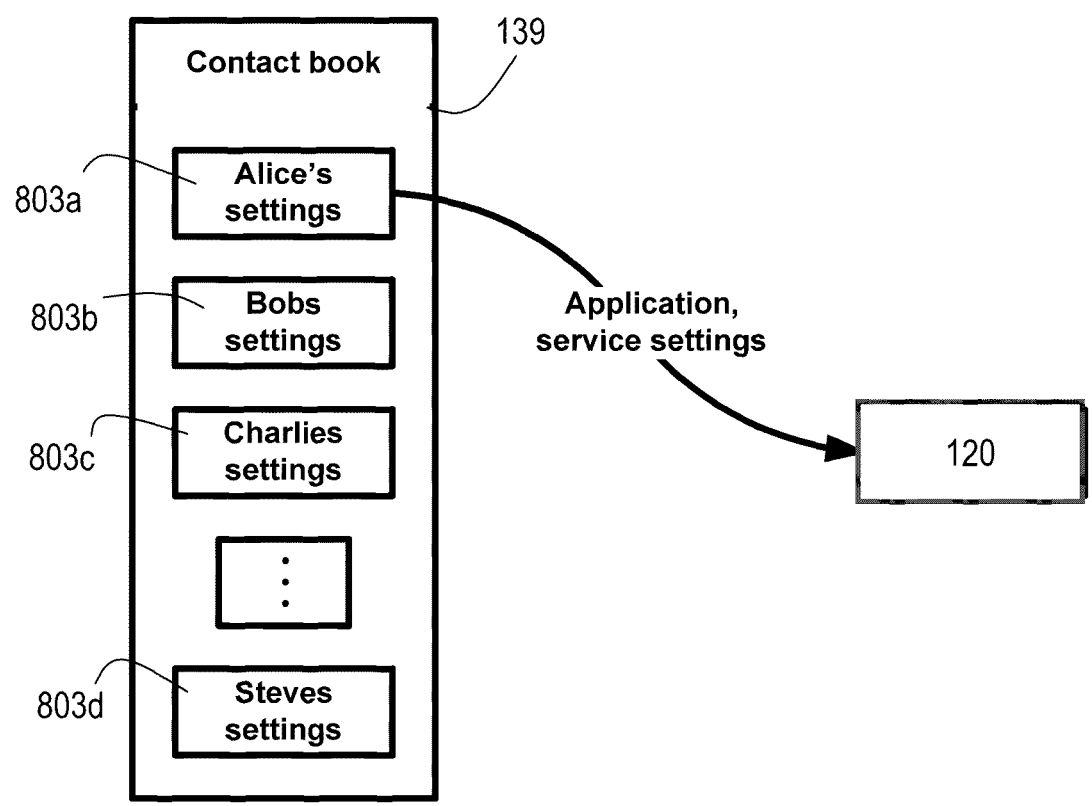
FIG. 8 is a diagram of contacts settings for an application in a user's contact book, according to an embodiment.

FIG. 8 is a diagram of contacts settings for an application in a user's contact book, according to an embodiment. In some embodiments, the user's contact book is on the user's local device, e.g., mobile terminal 120. In the illustrated embodiment, the contact book 139 is in the user's profile 137 on the social network database 135. In the illustrated embodiment, the contact book 139 includes a contact settings field, such as Alice's settings field 803a, Bob's settings field 803b, Charlie's settings field 803c, others indicated by the ellipsis, and Steve's settings field 803d, collectively referenced hereinafter as contacts' settings fields 803.

Upon installing an application, data in one or more of the settings fields 803 from the contact book 139 are delivered to the user's device, e.g., mobile terminal 120.

Figure 9:
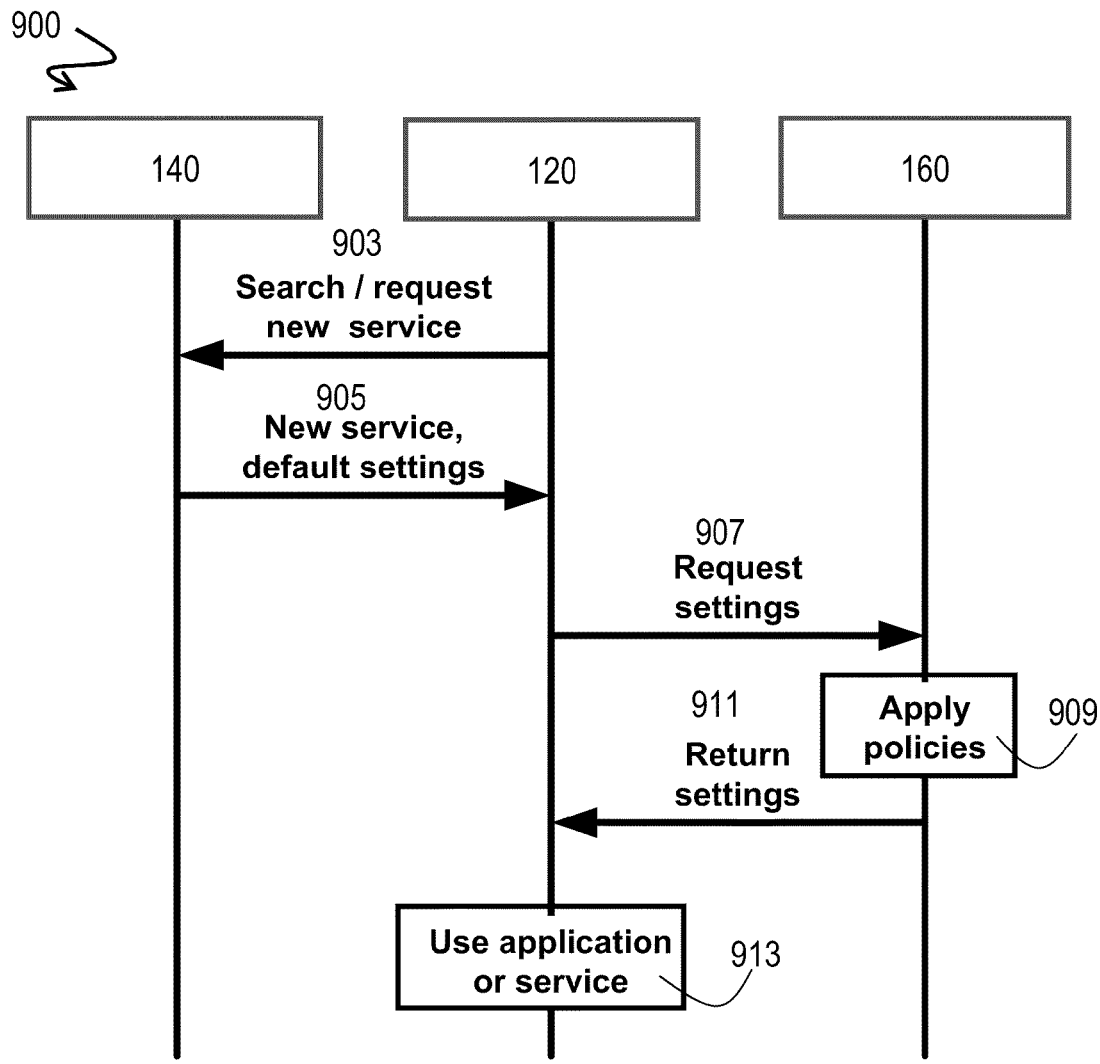
FIG. 9 is a time sequence diagram that illustrates a sequence of messages and processes for obtaining settings for installing an application, according to one embodiment.

FIG. 9 is a time sequence diagram that illustrates a sequence of messages and processes 900 for obtaining settings for installing an application, according to one embodiment. Time increases downward in this time sequence diagram. A network process on the network is represented by a thin vertical box. A message passed from one process to another is represented by horizontal arrows. A step performed by a process is indicated by a box overlapping the process at a time sequence indicated by the vertical position of the box.

The processes represented in FIG. 9 are an application provider process (not shown) on server host 140, an installation process on user's mobile terminal 120, such as the slate client 151b, and an application on contact's mobile terminal 160, such as application 161, Message 903 is sent by the user from mobile terminal 120 to service host 140 to search for, request and obtain a new application. In response, message 905 is received, which provides the application with default settings. For example, the server host 140 sends authorization to activate a pre-installed application with default settings.

The user's mobile terminal 120 then sends a request message 907 for settings for the application. In the illustrated embodiment, this message is sent to the mobile terminal 160 of a contact of the user. At the mobile terminal 160 of the contact, a process 909 applies policies that determine which, if any, of the contact's settings will be shared with the user. Any policy may be applied. In some embodiments, the settings are shared with no-one; in some, with everyone; and in some, only with trusted persons, such as friends on a social network. If the policy permits, then a message 911 is returned with one or more settings for the application from that contact. In the illustrated embodiment the process 909 is included in application 161.

In process 913, the application is installed and used on the user's mobile device 120 based, at least in part, on the settings returned in message 911.

These techniques provide for: using the application configuration of members of social networks to solve the problem of configuration and policy consistency (interdependency); using the application configuration of reviewers (e.g., members of social networks) to have a similar user experience as given in the reviews; using the application configuration of other users (e.g., members of social networks) to have sensible policy settings (e.g., privacy, access control); simple and intuitive setting of application parameters (e.g., drag and drop); and, simple parameter re-initialization when re-installing or upgrading applications, or transferring applications between devices. There are many derived advantages such as reciprocity in social networks, new services such as "selling settings", among others.

In some embodiments, a review includes recommendations for the configuration and policies settings. The reviewer could share these as well, and the interested party may use these. The actual settings could be hidden from the user; for example, the user could use a "drag-and-drop" user interface (UT) to take the reviewer's settings and apply them without examination.

In some embodiments, the user already uses a service, but wishes to change the user experience or modify policies towards other parties. The user looks in the contact database (e.g., the contact book on the mobile device, or a contact book 139 that is part of the service) and copies the configuration and policy settings of another as the user's own.

In some embodiments, the user merges settings taken from several sources, mixes and matches, or modifies the configuration and policy settings to personal liking, or some combination. In various embodiments, the settings modification is made using other methods, such as machine learning.

In some embodiments, the user is able to select to make all, or a subset of, policies and configuration settings available to other users. Thus, access rights may vary for different people.

As described above, the user may check a personal contact book to check who may have sensible settings. Thus, the user can take these settings, and can set values for all configuration and policy parameters in one action without solving the full complexity and possible interdependency of all parameters. The trusted contact will have been able to set access policies for these services (e.g., "settings accessible to people I invited myself," "settings accessible to people I interact with frequently," "public settings," among others). The access policies can be fine tuned per user and per application, and specific for a user pair. In some embodiments, settings are transferred via a secure channel.

The illustrated approach can be very useful when people are invited e.g. to social networks. When accepting an invitation, the user may choose to have the service settings (e.g., privileges) of the inviting party. This introduces reciprocity in the social network, and automatically fine-grained policy control. Over time, users can change policies according to the way the user interacts with the contact. This is very similar to how people interact with each other in face-to-face relationships.

Various advantages of various embodiments include: a simple and intuitive formulation of use policies for applications; and, sensible policies and service configuration that come from "similar" people (people in your network). Some embodiments simplify and improve user experience when upgrading or re-installing software, or transferring applications to other devices; there is no need for manual re-initialization of many parameters. Some embodiments automatically set application parameters to achieve the desired application functionality. By copying the parameters from the reviewer you reasonably can expect application behavior similar to the behavior touted in a review. Some embodiments provide expresses similarity between persons because having similar application settings implies that you want to use the application in a similar manner, which can re-enforce social bonds. Some embodiments enable implementation of reciprocity in social networks. When a new contact is established, you use the same policies the other uses for you. Over time you can change policies according to the way you interact with the person.

The processes described herein for automatic loading of applications may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such example hardware for performing the described functions is detailed below.

Figure 10:
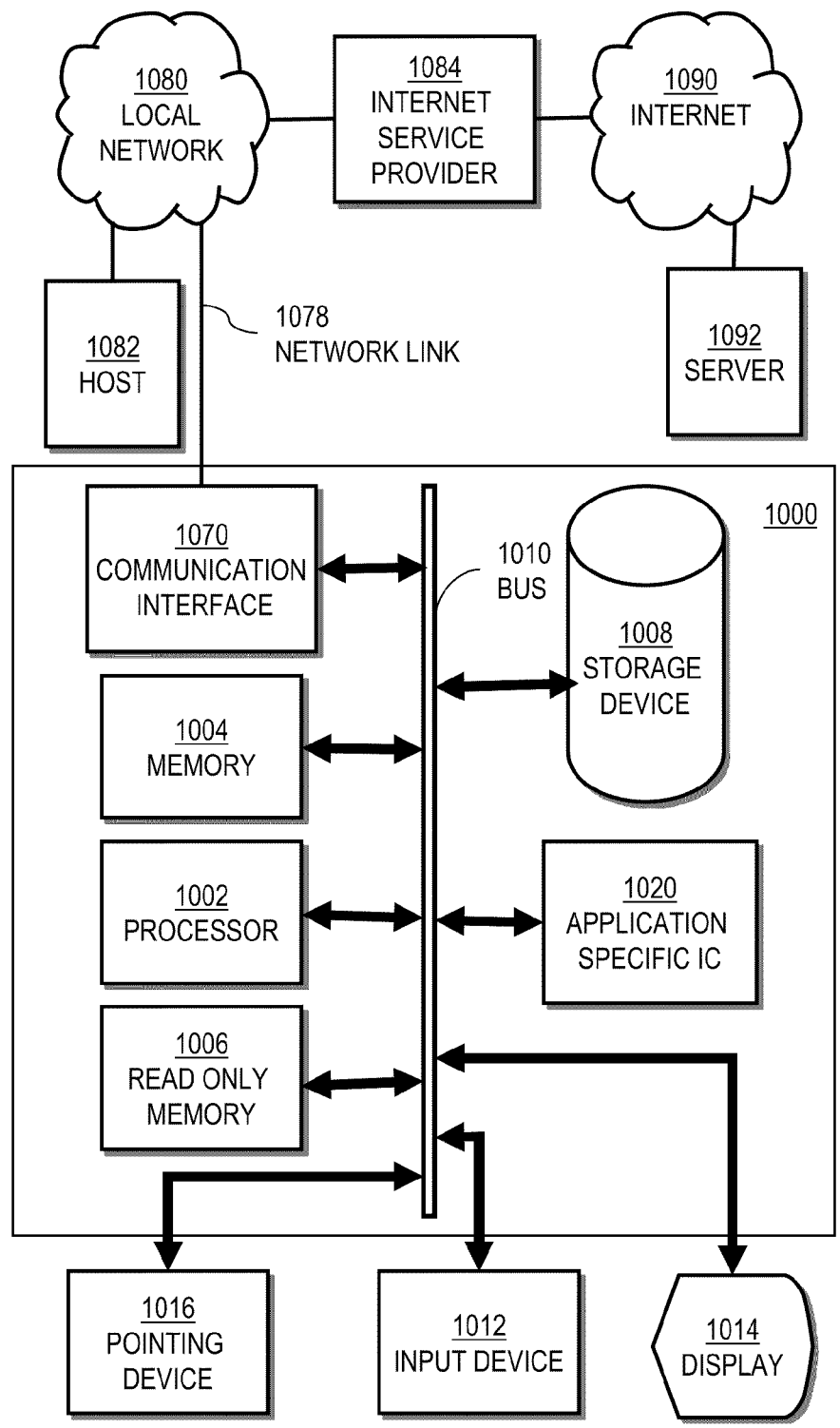
FIG. 10 is a diagram of hardware that can be used to implement an embodiment of the invention.

FIG. 10 illustrates a computer system 1000 upon which an embodiment of the invention may be implemented. Computer system 1000 includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1010 includes one or more parallel conductors of information so that information is transferred quickly among devices coupled to the bus 1010. One or more processors 1002 for processing information are coupled with the bus 1010.

A processor 1002 performs a set of operations on information. The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or other dynamic storage device, stores information including processor instructions. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT) or a liquid crystal display (LCD), or plasma screen or printer for presenting text or images, and a pointing device 1016, such as a mouse or a trackball or cursor direction keys, or motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver.

The term computer-readable medium is used herein to refer to any medium that participates in providing information to processor 1002, including instructions for execution. Such a medium may take many forms, including, but not limited to, non-volatile media, volatile media and transmission media. Non-volatile media include, for example, optical or magnetic disks, such as storage device 1008. Volatile media include, for example, dynamic memory 1004. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a transmission medium such as a cable or carrier wave, or any other medium from which a computer can read. Information read by a computer from computer-readable media are variations in physical expression of a measurable phenomenon on the computer readable medium. Computer-readable storage medium is a subset of computer-readable medium which excludes transmission media that carry transient man-made signals.

Logic encoded in one or more tangible media includes one or both of processor instructions on a computer-readable storage media and special purpose hardware, such as ASIC 1020.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090. A computer called a server host 1092 connected to the Internet hosts a process that provides a service in response to information received over the Internet. For example, server host 1092 hosts a process that provides information representing video data for presentation at display 1014.

At least some embodiments of the invention are related to the use of computer system 1000 for implementing some or all of the techniques described herein. According to one embodiment of the invention, those techniques are performed by computer system 1000 in response to processor 1002 executing one or more sequences of one or more processor instructions contained in memory 1004. Such instructions, also called computer instructions, software and program code, may be read into memory 1004 from another computer-readable medium such as storage device 1008 or network link 1078. Execution of the sequences of instructions contained in memory 1004 causes processor 1002 to perform one or more of the method steps described herein. In alternative embodiments, hardware, such as ASIC 1020, may be used in place of or in combination with software to implement the invention. Thus, embodiments of the invention are not limited to any specific combination of hardware and software, unless otherwise explicitly stated herein.

The signals transmitted over network link 1078 and other networks through communications interface 1070, carry information to and from computer system 1000. Computer system 1000 can send and receive information, including program code, through the networks 1080, 1090 among others, through network link 1078 and communications interface 1070. In an example using the Internet 1090, a server host 1092 transmits program code for a particular application, requested by a message sent from computer 1000, through Internet 1090, ISP equipment 1084, local network 1080 and communications interface 1070. The received code may be executed by processor 1002 as it is received, or may be stored in memory 1004 or in storage device 1008 or other non-volatile storage for later execution, or both. In this manner, computer system 1000 may obtain application program code in the form of signals on a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

Figure 11:
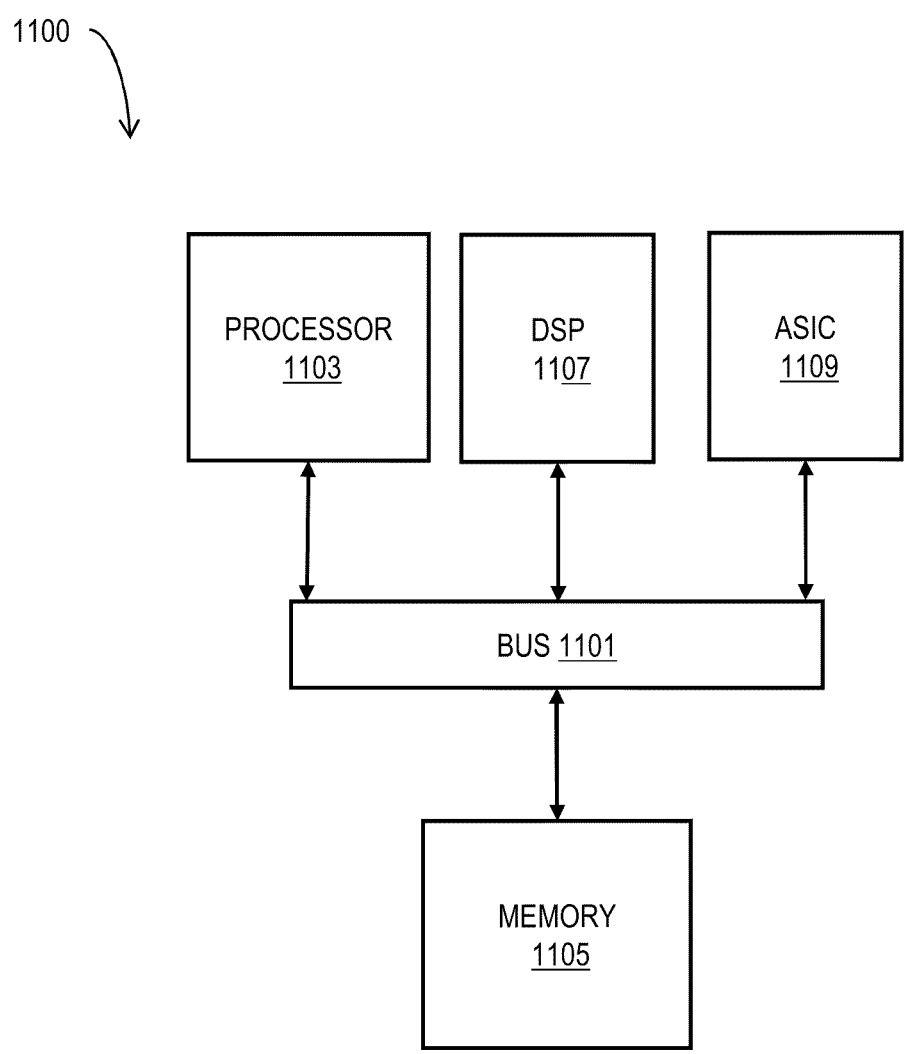
FIG. 11 is a diagram of a chip set that can be used to implement an embodiment of the invention.

FIG. 11 illustrates a chip set 1100 upon which an embodiment of the invention may be implemented. Chip set 1100 is programmed to carry out the inventive functions described herein and includes, for instance, the processor and memory components described with respect to FIG. 11 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-word signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein. The memory 1105 also stores the data associated with or generated by the execution of the inventive steps.

Figure 12:
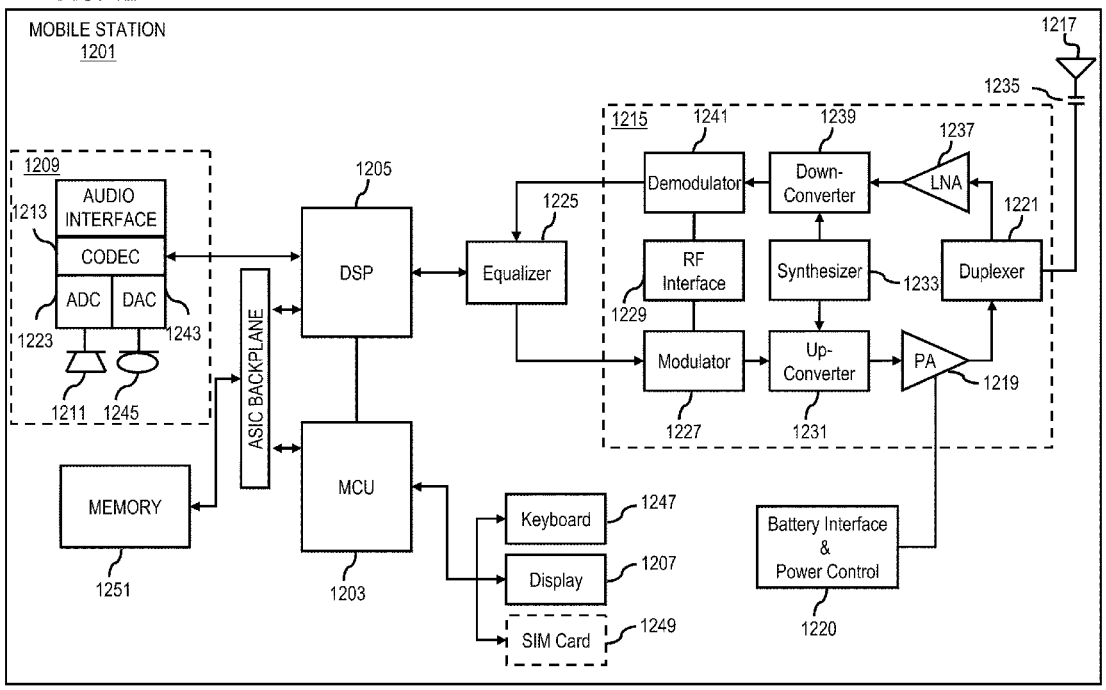
FIG. 12 is a diagram of a terminal that can be used to implement an embodiment of the invention.

FIG. 12 is a diagram of example components of a mobile station (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the station include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile station functions. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile station 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In the example embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203-which can be implemented as a Central Processing Unit (CPU) (not shown).

The MCU 1203 receives various signals including input signals from the keyboard 1247. The MCU 1203 delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the station. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile station 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable storage medium known in the art. The memory device 1251 may be, but not limited to, a single memory, CD, DVD, ROM, RAM, EEPROM, optical storage, or any other non-volatile storage medium capable of storing digital data.

An optionally incorporated SIM card 1249 carries, for instance, important information, such as the cellular phone number, the carrier supplying service, subscription details, and security information. The SIM card 1249 serves primarily to identify the mobile station 1201 on a radio network. The card 1249 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   receiving, at an apparatus, user identification corresponding to a device;
   receiving, at the apparatus, data indicating a set of one or more relevant applications comprising a subset of a plurality of available applications, wherein the set is automatically selected based on the user identification and an application recommended, frequently used, or a combination thereof, by a contact of the user, wherein the available applications are cached and hidden but not installed in the device; and
   initiating, by the apparatus, installation of an application of the subset within the device.

2. A method of claim 1, further comprising initiating display of an icon representing the installed application, wherein the installed application is launched by user input indicating activation of the icon,
   wherein the available applications are cached in the device by a device manufacturer.

3. A method of claim 1, further comprising:
   initiating display of a predetermined screen on a user interface of the device that indicates no pre-installation of the relevant applications.

4. A method of claim 1, further comprising:
   generating a request message comprising the user identification and requesting the set of one or more applications;
   initiating transmission of the request message to a trusted source; and
   receiving a response message specifying the set, wherein the set is automatically selected based on the recommended, frequently used, or a combination thereof, application by the trusted source.

5. A method of claim 1, further comprises:
   receiving settings for the application by a contact of a user identified by the user identification,
   wherein the installation of the application is based on the settings by the contact.

6. A method of claim 3, wherein initiating installation of the application further comprises initiating execution of a locally cached copy of the application.

7. A method of claim 1, further comprising initiating storing caching locally a copy for each of the plurality of available applications before receiving data indicating user identification.

8. A method of claim 6, wherein no icon is displayed for the locally cached available applications before receiving the data indicating the set of one or more relevant applications.

9. A method of claim 1, wherein initiating installation of the application further comprises:
   initiating display of the set of relevant applications; and
   receiving input indicating the application to be installed from among the subset.

10. An apparatus comprising:
    at least one processor; and
    at least one memory including computer program code, the at least one memory and the computer program code configured to, with the at least one processor, cause the apparatus to perform at least the following:
    receive user identification for a user of the apparatus;
    receive data indicating a set of one or more relevant applications comprising a subset of a plurality of available applications, wherein the set is automatically selected based on the user identification and an application recommended, frequently used, or a combination thereof, by a contact of the user, wherein the available applications are cached and hidden but not installed in the apparatus; and
    initiate installation of an application of the subset within the apparatus.

11. An apparatus of claim 10, wherein the apparatus is further configured to initiate display of an icon representing the installed application, wherein the installed application is launched by user input indicating activation of the icon.

12. An apparatus of claim 10, wherein the apparatus is further configured to initiate display of a predetermined screen that indicates no pre-installation of applications.

13. An apparatus of claim 10, wherein the apparatus is further configured to:
    generate a request message comprising the user identification and requesting the set of one or more applications;
    initiate transmission of the request message to a trusted source; and
    receive a response message specifying the set, wherein the set is automatically selected based on the recommended, frequently used, or a combination thereof, application by the trusted source.

14. An apparatus of claim 10, wherein:
    the apparatus is further configured to receive settings for the application by a contact of a user identified by the user identification; and
    the installation of the application is based on the settings by the contact.

15. An apparatus of claim 10, wherein the step to initiate installation of the application further comprises initiate execution of a locally stored copy of the application.

16. An apparatus of claim 10, wherein the apparatus is further configured to initiate storing locally a copy for each of one or more of the plurality of available applications before the step to receive data indicating user identification.

17. An apparatus of claim 10, wherein the step to initiate installation of the application further comprises:
    initiate display of the set of relevant applications; and
    receive input indicating the application to be installed from among the subset.

18. An apparatus comprising:
at least one processor; and
at least one memory including computer program code, the at least one memory and the computer program code configured to, with the at least one processor, cause the apparatus to perform at least the following:
store data indicating a plurality of users, contacts among the plurality of users, and applications recommended, frequently used, or a combination thereof, by the plurality of users;
receive data indicating user identification for a first user at a first network node;
select a relevant application based on an application recommended, frequently used, or a combination thereof, by a contact of the first user; and
initiate sending to the first network node a message comprising data that indicates the relevant application.

19. A method comprising:
providing access to a social service via a network, the social service comprising social service data that indicates a plurality of users, contacts among the plurality of users, and applications recommended, frequently used, or a combination thereof, by the plurality of users;
providing access to receive at the social service a request message comprising data that indicates user identification for a first user at a first network node; and
transmitting to the first network node a message comprising data that indicates a relevant application based on an application recommended, frequently used, or a combination thereof, by a contact of the first user.

20. A method of claim 19, further comprising transmitting to the first network node a message comprising data that indicates settings by the contact for the relevant application.

* * * * *